(12) United States Patent
Chandra et al.

(10) Patent No.: US 7,391,730 B1
(45) Date of Patent: Jun. 24, 2008

(54) SYSTEM AND METHOD FOR SYNCHRONIZING LINK STATE DATABASES IN A NETWORK ENVIRONMENT

(75) Inventors: Madhavi W. Chandra, Cary, NC (US); David A. Cook, Raleigh, NC (US); Alvaro E. Retana, Morrisville, NC (US); Russell I. White, Holly Springs, NC (US); Yi Yang, Morrisville, NC (US)

(73) Assignee: Cisco Technology, San Jose, CA (US)

( * ) Notice: Subject to any disclaimer, the term of this patent is extended or adjusted under 35 U.S.C. 154(b) by 721 days.

(21) Appl. No.: 10/895,719

(22) Filed: Jul. 21, 2004

(51) Int. Cl.
*G01R 31/08* (2006.01)
*H04J 3/06* (2006.01)

(52) U.S. Cl. .................................. 370/236; 370/503
(58) Field of Classification Search ............ 370/389, 370/400, 200, 410, 252, 351, 236, 350, 503, 370/255, 254, 238, 395.31; 709/238, 242
See application file for complete search history.

(56) References Cited

U.S. PATENT DOCUMENTS

| | | | |
|---|---|---|---|
| 5,345,558 A | 9/1994 | Opher et al. ............ 395/200 |
| 5,511,122 A | 4/1996 | Atkinson ................ 380/25 |
| 5,590,118 A | 12/1996 | Nederlof ................ 370/218 |
| 5,757,924 A | 5/1998 | Friedman et al. ........ 380/49 |
| 5,815,490 A | 9/1998 | Lu |
| 5,825,772 A | 10/1998 | Dobbins et al. ......... 370/396 |
| 5,881,243 A | 3/1999 | Zaumen et al. ......... 395/200.71 |
| 5,926,101 A | 7/1999 | Dasgupta ............... 340/825.02 |
| 6,055,561 A | 4/2000 | Feldman et al. ......... 709/200 |
| 6,069,889 A | 5/2000 | Feldman et al. ......... 370/351 |
| 6,108,702 A | 8/2000 | Wood .................... 709/224 |
| 6,111,884 A | 8/2000 | Ahuja et al. ............ 370/401 |
| 6,130,889 A | 10/2000 | Feldman et al. ......... 370/397 |
| 6,131,120 A | 10/2000 | Reid ..................... 709/225 |
| 6,148,000 A | 11/2000 | Feldman et al. ......... 370/397 |
| 6,151,324 A | 11/2000 | Belser et al. ........... 370/397 |
| 6,256,295 B1 | 7/2001 | Callon .................. 370/254 |
| 6,347,078 B1 | 2/2002 | Narvaez-Guarnieri et al. ... 370/230 |
| 6,366,962 B1 | 4/2002 | Teibel |
| 6,385,174 B1 | 5/2002 | Li ....................... 370/252 |
| 6,393,486 B1 | 5/2002 | Pelavin et al. .......... 709/238 |
| 6,405,248 B1 | 6/2002 | Wood .................... 709/223 |
| 6,449,279 B1 | 9/2002 | Belser et al. ........... 370/397 |
| 6,483,833 B1 | 11/2002 | Jagannath et al. ....... 370/392 |
| 6,526,052 B1 | 2/2003 | Rijhsinghani et al. .... 370/389 |
| 6,535,510 B2 | 3/2003 | Kalkunte et al. ........ 370/389 |
| 6,578,086 B1 | 6/2003 | Regan et al. ........... 709/242 |
| 6,584,093 B1 | 6/2003 | Salama et al. .......... 370/351 |

(Continued)

OTHER PUBLICATIONS

PCT International Search Report, International Application No. PCT/US05/01106, mailed Oct. 26, 2006, 10 pages.

*Primary Examiner*—Kwang Bin Yao
*Assistant Examiner*—Candal Elpenord
(74) *Attorney, Agent, or Firm*—Baker Botts L.L.P.

(57) ABSTRACT

A method for communicating packets in a network environment is provided that includes communicating, by a first network element, a first summary update to a second network element. The method further includes receiving a second summary update from the second network element. The exchange of the first and second summary updates achieves adjacency between the first and second network elements. The first and second summary updates include, at least, locally generated state information and a single link state.

13 Claims, 2 Drawing Sheets

U.S. PATENT DOCUMENTS

| | | | |
|---|---|---|---|
| 6,625,156 B2 | 9/2003 | Shaio et al. | 370/395.21 |
| 6,639,897 B1 | 10/2003 | Shiomoto et al. | 370/238 |
| 6,657,965 B1 | 12/2003 | Shaffer et al. | 370/238 |
| 6,820,134 B1 * | 11/2004 | Zinin et al. | 709/238 |
| 6,823,395 B1 | 11/2004 | Adolfsson | |
| 6,950,427 B1 * | 9/2005 | Zinin | 370/386 |
| 6,985,959 B1 | 1/2006 | Lee | |
| 7,248,579 B1 * | 7/2007 | Friedman | 370/389 |
| 7,298,707 B2 * | 11/2007 | Retana et al. | 709/238 |
| 2002/0054572 A1 * | 5/2002 | Saleh et al. | 370/254 |
| 2003/0014540 A1 * | 1/2003 | Sultan et al. | 709/240 |
| 2003/0067924 A1 | 4/2003 | Choe et al. | |
| 2003/0067925 A1 | 4/2003 | Choe et al. | |
| 2004/0028060 A1 | 2/2004 | Kang | |
| 2004/0247317 A1 | 12/2004 | Sadananda | |
| 2005/0018667 A1 * | 1/2005 | Chandra et al. | 370/389 |
| 2005/0160179 A1 * | 7/2005 | Retana et al. | 709/238 |

* cited by examiner

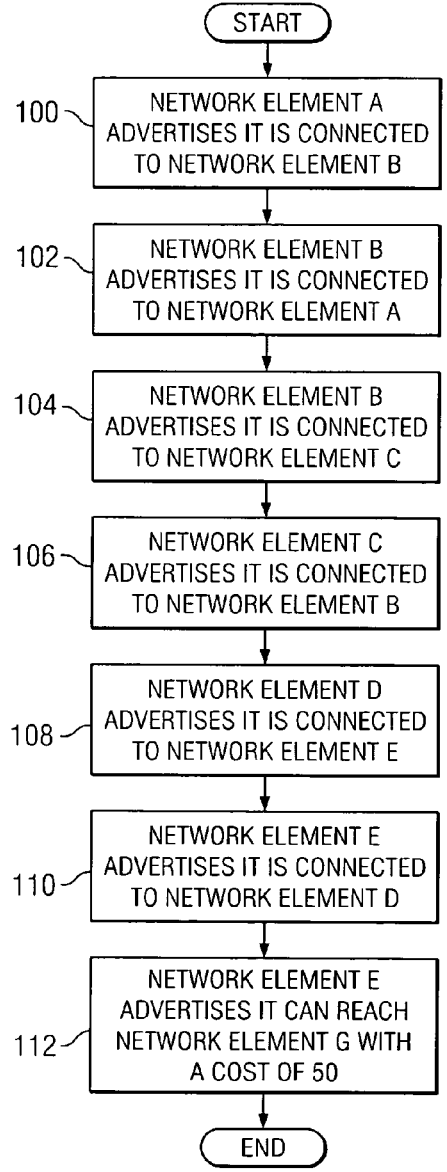
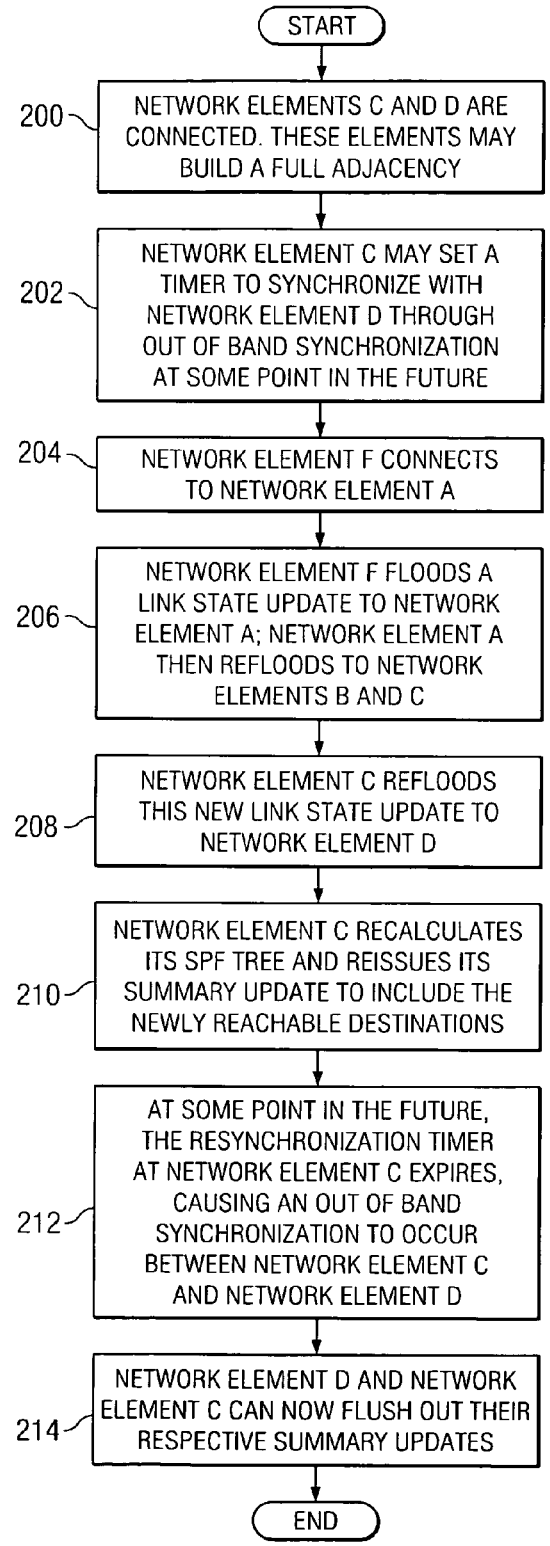

SYSTEM AND METHOD FOR SYNCHRONIZING LINK STATE DATABASES IN A NETWORK ENVIRONMENT

TECHNICAL FIELD OF THE INVENTION

This invention relates in general to the field of communications and, more particularly, to a system and a method for synchronizing link state databases in a network environment.

BACKGROUND OF THE INVENTION

Networking architectures have grown increasingly complex in communication environments. This complexity has resulted in numerous protocols being implemented in order to ensure that network elements are aware of their surroundings and to direct packets in an efficient manner. For example, certain network elements may exchange packets in order to indicate to each other the absence or presence of an adjacent network element or to provide routing updates. In this manner, neighbors are able to become aware of their surroundings and direct or manage traffic properly.

The signaling data that gets passed between network elements is crucial for effective routing of information or data. The signaling data serves as a basis for an effective synchronization between elements. However, as network systems become more sophisticated, this information exchange may become cumbersome. This may be due to any number of reasons, such as having a prolific amount of network elements in the system or having an abundance of signaling data being exchanged between network elements. As a result, the propagation and processing of such signaling data can be arduous. Moreover, in virtually all networking architectures, speed is a critical issue.

The exchange of signaling data generally slows communication speeds and inhibits system performance. In certain cases, signaling data may be exchanged and then quickly become obsolete, as a given network element disappears (e.g. fails or gets removed from the network). Hence, in some circumstances certain signaling data may be exchanged and then not used again. As a result, certain scenarios could benefit from only minimal data exchanges, with a subsequent opportunity for a future retrieval of additional information. Thus, the ability to offer a system or a protocol that effectively synchronizes existing network elements (without hindering system speeds, taxing processing capabilities of network components, or exchanging a large amount of data that could be irrelevant later) provides a significant challenge to network designers, component manufacturers, and system administrators.

SUMMARY OF THE INVENTION

From the foregoing, it may be appreciated by those skilled in the art that a need has arisen for an improved communications approach that minimizes the information exchanges in packet communications to achieve optimal synchronization of link state databases. In accordance with one embodiment of the present invention, a system and a method for synchronizing link state databases in a network environment are provided that greatly reduce disadvantages and problems associated with conventional synchronization techniques.

According to one embodiment of the present invention, there is provided a method that includes communicating, by a first network element, a first summary update to a second network element. The method further includes receiving a second summary update from the second network element. The exchange of the first and second summary updates achieves adjacency between the first and second network elements. The first and second summary updates include, at least, locally generated state information and a single link state.

Certain embodiments of the present invention may provide a number of technical advantages. For example, according to one embodiment of the present invention, a communications approach is provided that allows for optimal synchronization (of newly formed neighbors) with only a minimal amount of signaling data to be exchanged between network elements. Such a mechanism offers a quick way to initially synchronize routing information in a link state protocol such that effective routing can occur as quickly as possible. In addition, such a mechanism is also capable of offering the ability to fully synchronize the link state databases at some future point (after the initial synchronization) through the exchange of one or more summary updates.

Yet another technical advantage of the present invention is that it achieves its operations with minimal overhead. The proffered architecture is simple, requires few changes to a given routing protocol state machine, and avoids modifications to packet formats or route calculation mechanisms. Note that such an approach is also flexible: allowing a given network device to determine, based on existing network conditions, how much information should be exchanged. This system also grants an allowance for complete information exchange, as the neighbor adjacency remains in operation, by summarizing the information available in a network element's local tables at initial adjacency establishment.

Such an approach to network communications operates to conserve resources and to lower network overhead. Moreover such information management techniques may reduce the number of central processing unit (CPU) cycles needed to be performed by a given network component, as the signaling information being exchanged is minimized during initial adjacency. In essence, reachability information is exchanged in order to quickly route information, whereas topology information is retrieved at a future time (if necessary). Thus, because less information is being transmitted in the network, fewer resources are consumed as the data is properly processed. Additionally, the reduction in network traffic may translate into less network bandwidth being occupied by routing protocols engaged in such data exchanges.

Note that the reduction in network traffic (i.e. bandwidth optimization) may be particularly important in certain types of networks, e.g. lower speed networks, shared medium networks, etc., but also generally beneficial to any packet communications. Many network scenarios (e.g. in mobile ad hoc network (MANET) applications) may include very slow speeds and/or low bandwidth links that are included in a corresponding system. Other important network considerations may include battery constraints that are present in many network devices and timing limitations that need to be carefully managed. These network parameters can readily be accommodated by the present architecture, which allows for improved battery consumption and for optimal timing allocations associated with a set of network devices.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified flowchart illustrating a series of example steps associated with the communication system; and FIG. 3 is a simplified flowchart illustrating another series of example steps associated with the communication system.

DETAILED DESCRIPTION OF EXAMPLE EMBODIMENTS

Figure 1:
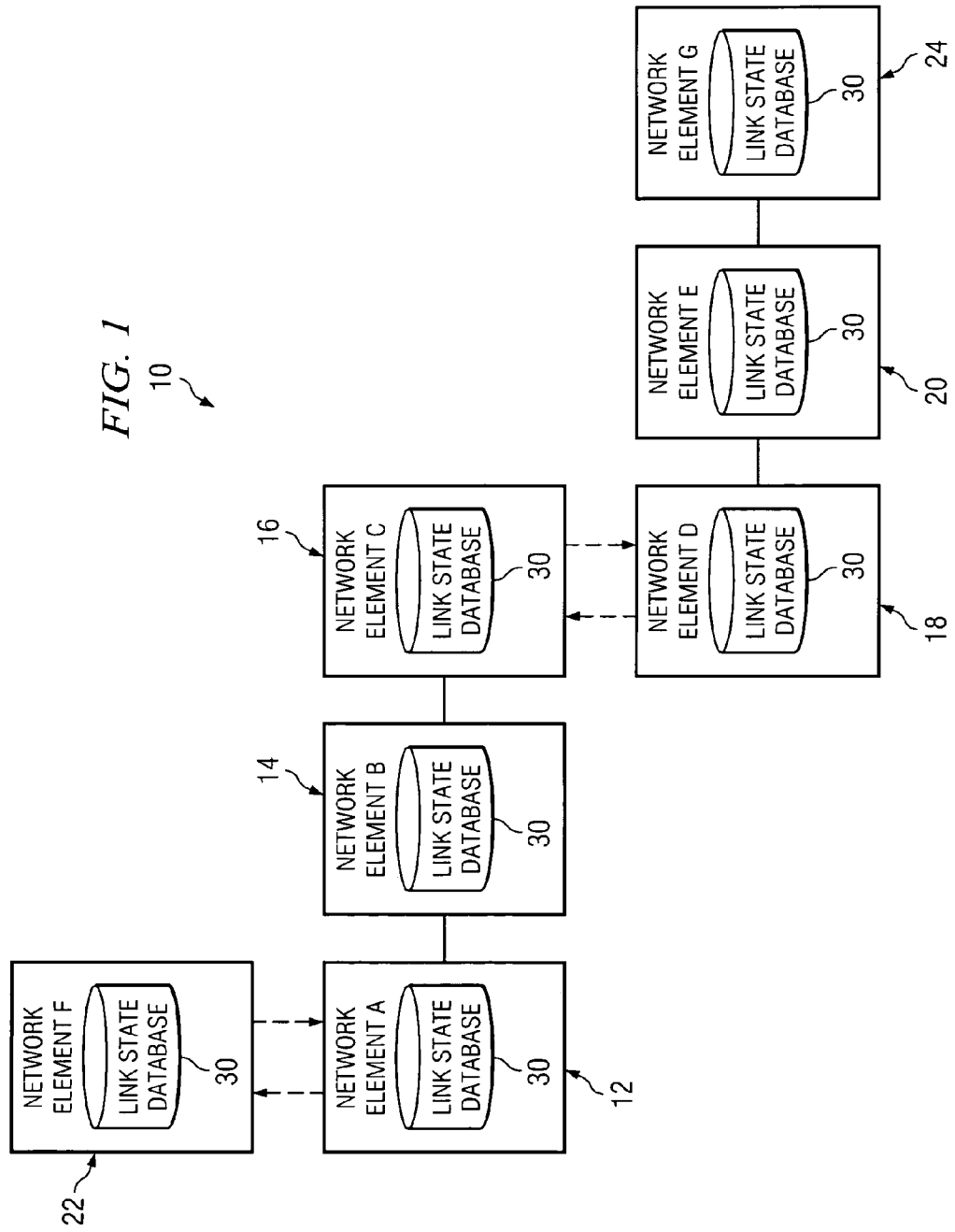
FIG. 1 is a simplified block diagram of a communication system for synchronizing link state database information in a network environment in accordance with one embodiment of the present invention.

FIG. 1 is a simplified block diagram of a communication system 10 for synchronizing link state database information in a network environment. Communication system 10 may include multiple network elements 12, 14, 16, 18, 20, and 22. Network elements 12, 14, 16, 18, 20, and 22 may also be referred to herein as network elements A-F respectively. The letter designations assigned to network elements 12, 14, 16, 18, 20, and 22 do not connote any type of hierarchy; the designations are arbitrary and have been used for purposes of teaching only. These designations should not be construed in any way to limit their capabilities, functionalities, or applications in the potential environments that may benefit from the features of communication system 10. Each network element 12, 14, 16, 18, 20, and 22 may be equipped with a link state database 30 that includes information associated with surrounding network elements, as well as data to be used in routing packets in the context of network communications. Additional details relating to the architecture and functionality of link state database 30 is provided below.

FIG. 1 may be generally configured or arranged to represent any communication architecture capable of exchanging packets in a network environment. Such configurations may include, for example, first generation, 2 G, 2.5 G, and 3 G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In accordance with the techniques and teachings of the present invention, communication system 10 provides a communication approach that allows network elements A-F to exchange information via a suitable protocol such that only a minimum amount of signaling information is learned in order to route information quickly and optimally. Communication system 10 allows for quick synchronization of newly formed network neighbors with minimal overhead. The architecture of communication system 10 also allows for complete information exchange, as the neighbor adjacency remains operational. This may be achieved by summarizing the information available in a network element's local tables at initial adjacency establishment.

Communication system 10 may use summary updates to offer reachability destinations, whereby the topology information is not necessarily provided (i.e. the reachability capabilities are offered and exchanged, but not necessarily how the selected network element is going to reach that destination). During adjacency formation, a given network element can advertise his reachability capabilities, but not how it can reach those destinations. Over time, a given network element can then recognize that it has all of the reachability information that it needs, but now it can elect to see the additional topology information that it lacks. The topology information could then be used by a network element to build a tree describing the shortest path to each reachable destination within the network. Thus, in essence, a given network element can send reachability information first and then schedule a future time (via out of band resynchronization) to exchange desired topology information.

Such a procedure can execute a neighbor adjacency process quickly by using summary updates, which reflect a minimal data exchange. Normally, such summary updates are exchanged on hard defined borders in the network: not between two nodes during the adjacency process. Then, at some scheduled future time, additional information (related to topology information) may be exchanged between network elements. This achieves optimal synchronization of newly formed neighbors with only a minimal amount of signaling data to be exchanged between network elements. Such a mechanism offers a quick way to initially synchronize routing information in a link state protocol such that effective routing can occur as quickly as possible. However, it is important to note that such a mechanism is also capable of fully synchronizing the link state databases at some future point after the initial synchronization.

The present configuration allows adjacencies to be formed quickly and traffic to be readily forwarded, while exchanging as little information as reasonably possible. Communication system 10 promotes efficiency, via data exchanges, without sacrificing integrity in packet communications. In cases where the adjacency is still valid at a future time (i.e. the network elements are still operational and present in the network), the present architecture allows a network element to retrieve the additional link state information that it lacks. In general, it is beneficial to exchange as little data as possible and yet still reach all peers. Thus, a tension or a tradeoff exists in attempting to minimize the number of transmissions for network element A, while still ensuring that all neighbors are reached. In a general sense, an exponential increase is achieved by implementing such a protocol throughout the network. Thus, such a communication approach offers the best of both worlds in achieving adjacency quickly, while providing the complete topology information (if necessary) at a future time.

Network elements A-F are routers with appropriate software to execute the described operations in an example embodiment; however, network elements A-F may be any other suitable device and include other elements to perform such operations where appropriate and in accordance with particular needs. For example, network elements A-F may be switches, gateways, bridges, loadbalancers, firewalls, or any other suitable device, component, element, or object operable to exchange information in a network environment. Moreover, network elements A-F may include any suitable hardware, software, components, modules, interfaces, or objects that facilitate the operations thereof. This may be inclusive of appropriate algorithms and communication protocols that allow for the effective exchange of data or information. In an example embodiment, the update and routing information may be exchanged via routing protocol packets. In alternative embodiments, network elements A-F may use any suitable communication protocols that operate to indicate the presence or absence of surrounding or adjacent network elements.

Note that the terms 'adjacent' and 'surrounding' reflect broad terminology that may be used interchangeably herein in this document. These terms connote an idea of awareness, as it relates to the presence or absence of any component, device, or element.

Link state databases 30 may be included in network elements A-F. In other embodiments, link state databases 30 may be provided externally to network elements A-F, or consolidated such that a single link state database 30 serves multiple network elements. Link state databases 30 are memory elements for storing information to be referenced by corresponding network elements A-F. As used herein in this document, the term 'link state database' is inclusive of any suitable database or storage medium (provided in any appropriate format) that is capable of maintaining information pertinent to the routing and/or processing operations of network elements A-F. For example, link state databases 30 may store such information in a table or a queue. Alternatively, link state database 30 may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs. Note that the neighbor list, as described herein, is also amenable to such flexibility. Accordingly, it may be provided in any of the potential storage elements identified above (or provided externally as discussed supra). The neighbor list may also be included in a neighbor table or a neighbor database, or be replaced thereby where appropriate.

For purposes of illustrating this technique, it is important to understand the somewhat esoteric communications that may be traversing the network and that provide awareness data or routing information to any given network element. Routing protocols generally include various types of neighbor states in their periodically transmitted neighbor state packets. For instance, a routing protocol may include a list of known neighbors on a given link so that each network element A-F attached to that network can establish whether or not two-way connectivity exists between itself and the network element that is transmitting the packet.

In most scenarios, it is generally important to be made aware of the presence or the absence of a neighbor as quickly as possible. Thus, packets may be communicated to adjacent network elements in order to provide routine or systematic updates, which reflect current or the most recent state information. In this sense, network elements need only know what is new or what has been changed in the network.

The packets received by network element A-F may be congruous, inclusive of an extensive listing of the neighbors that are present or absent in the network. The absence of a neighbor may indicate that something has happened: for example, some element has become non-operational or dysfunctional. The presence of a network element may reflect an already existing element or a new element that was added to the networking architecture. A given network element A-F (i.e. a speaker) may receive routing protocol packets from all other adjacent speakers. The routing protocol packets may contain a list of the adjacent speakers to the originator (i.e. a neighbor list, a neighbor table, or a neighbor database). The local speaker may compare the neighbor list reported by each speaker to its own neighbor list. In certain network environments, a designated network element or a designated intermediate system is often employed to achieve synchronization. When a piece of network equipment appears on the network it would quickly determine the designated network element (e.g. router) or designated link and then synchronize with that object.

Referring back to FIG. 1, assume that two networks are present. The first network includes network elements A, B, and C. The second network includes network elements D, E, and G. Network elements A, B, and C are all fully synchronized with their adjacent neighbors, and network elements D and E are fully synchronized in this example. At some point, network elements C and D are connected (illustrated by broken arrows). The normal process of adjacency formation would include: 1) network elements C and D receive HELLO packets from one another; 2) network elements C and D transmit HELLOs with each other's identifier in the HELLO packets; 3) network elements C and D exchange descriptions of their local link state databases; and 4) network elements C and D exchange link state updates so that their local link state databases are synchronized (i.e. they should be virtually identical in content).

In an environment where the neighbors adjacent to a given network element may change often, and bandwidth is limited, this above-outlined synchronization process can waste valuable resources. An optimization of this initial database synchronization is offered by communication system 10 and a significant reduction in the computational overhead is achieved (i.e. no groups or transitive/dynamic synchronization are assumed). In addition, traffic overhead may be distributed over a longer period of time without impacting the initial convergence operation. In order to fully comprehend and understand the operations of communication system 10, the types of information contained in a given link state database 30 should be evaluated. This evaluation in provided in conjunction with the description of FIG. 2 provided below.

FIG. 2 is a simplified flowchart that includes a series of example steps associated with an operation of communication system 10. The illustration of FIG. 2 has been provided for purposes of teaching only and, therefore, should be construed as such. There are generally two types of information in a given link state database 30 included in a given network element A-F: 1) topology information; and 2) reachability information. For example, consider step 100 of FIG. 2, where network element A advertises that it is connected to network element B. At step 102, network element B advertises that it is connected to network element A. At step 104, network element B advertises that it is connected to network element C. Network element C advertises that it is connected to network element B at step 106. At step 108, network element D advertises it is connected to network element E. At step 110, network element E advertises it is connected to network element D. Finally, network element E advertises it can reach network element G, but with a cost of 50.

Topology information relates to connections to other devices in the network, such as network element A being connected to network element B, and network element B being connected to network element C. Given this topology information, a link state protocol can use (for example) Dijkstra's Shortest Path First (SPF) algorithm to determine the best path to any destination within the network.

Reachability information generally only includes a destination and a cost. In the example database described above, a network element does not learn that network element E is connected to network element G, or that network element G is connected to network element E. All that is learned is that network element G is reachable via network element E with a given cost 50. Nothing is learned about connectivity: only reachability information is provided. This concept is used extensively in link state protocols at flooding domain borders.

For instance, in open shortest path first (OSPF), the link state topology information about a given flooding domain is summarized by the border network element (e.g. a border router) simply advertising the reachable destinations within the area, as well as the cost to reach each of those destinations.

Communication system 10 can take advantage of this concept in the initial database synchronization stage after adjacency formation to reduce the amount of time required to exchange the topology information contained in link state databases 30. If, again, network elements C and D were connected, the adjacency formation process would be: 1) network elements C and D receive HELLO packets from one another. Network elements C and D transmit HELLO packets with each other's identifier in the HELLO packet. Network elements C and D exchange descriptions of their databases. This description is altered so it only includes two pieces of information: the locally generated link state information (i.e. the network element link state advertisement (LSA) in OSPF, the locally originated link state packet (LSP) in intermediate system-to-intermediate system (IS-IS)), and a single link state describing reachable destinations and their distances (i.e. a summary of the link state database containing only reachability information). The new link state type may be referred as a "summary update" as used herein in this document.

Network elements C and D exchange their summary updates. Network elements C and D exchange their locally generated link state updates and are now fully adjacent. Once the full adjacency is formed, network elements C and D would know how to reach every destination in the network, but they would not know any topology information about the network. Since one of the primary advantages of a link state protocol over a distance vector protocol (i.e. a distance vector protocol is one that exchanges only reachable destinations and their distances, and no connection information) is this knowledge of the topology of the network. Thus, it would be beneficial to eventually synchronize this topology information as well.

Note that with topology information, a database may be constructed from which a "tree" of connectivity within the network is built. Reachability information can then be "hung" like "leaves" from that proverbial tree of connectivity. The completed tree can then be used as a map for network elements to determine routes in the network. This is how a link state protocol generally works. In certain scenarios, an interested network element may only want to see the leaves of the tree (from the analogy above), instead of understanding what the tree necessarily looks like or the exact details concerning the topology information. Communication system 10 may operate to cut off a proverbial branch and then apply the leaves directly to the trunk of the tree of connectivity.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

FIG. 3 is a simplified flowchart illustrating a series of example steps associated with a method for synchronizing link state databases within communication system 10. In this example, FIG. 3 represents an example operation from the perspectives of network elements C and D. In such a configuration, as well as other configurations described with reference to FIGS. 1-2, the corresponding network elements may be suitably equipped with a receiving state (interface), a transmitting state (interface), and/or any suitable algorithm, software, hardware, module, object or element operable to effectuate the operations of the corresponding network element.

Synchronization of full link state topology information is achieved in FIG. 3. The proposed mechanism proposes a quick way to initially synchronize routing information in a link state protocol, so routing can occur as quickly as possible, whereby full synchronization of the link state database occurs at some point after the initial synchronization through the exchange of the summary update. This may be achieved through the use of out of band resynchronization following adjacency formation.

The flowchart may begin at step 200, where network elements C and D are connected. These elements may build a full adjacency using the process outlined above. At step 202, network element C may set a timer to synchronize with network element D through out of band synchronization at some point in the future. Network element F then connects to network element A at step 204. At step 206, network element F floods a link state update to network element A; network element A then refloods to network elements B and C. Network element C refloods this new link state update to D at step 208.

Network element C recalculates its SPF tree and reissues its summary update to include the newly reachable destinations at step 210. At some point in the future, the resynchronization timer at network element C expires, causing an out of band synchronization to occur between network element C and network element D at step 212. As these two network elements exchange their database descriptors, network element D discovers it already has network element A's and network element F's link state updates, so they are not exchanged.

At step 214, network element D and network element C can now flush out their respective summary updates. The longer the newly adjacent network elements wait before fully resynchronizing their databases, the more information they are likely to learn through normal flooding of new information in the network (and reflooding of expired information). The amount of time to wait before the reflood can be entirely device-dependent, and, thus, each device in a network can determine, based on its particular circumstances, how long to wait before this synchronization takes place.

To provide more efficiency a network element should generally not perform out of band resynchronization with more than one neighbor at a time. If a network element has two neighbors waiting for an out of band resynchronization, and both timers expire at the same time, it should resynchronize with one neighbor before resynchronizing with the other. This allows a network element to discover as much information as possible from each neighbor: reducing the amount of information exchanged in total.

In the context of protocols, the summary update is the same as the corresponding summary link state update in existing link state routing implementations. Hence, there is no change to the SPF algorithm, nor does this mechanism add new packet types to be processed. Thus, the approach of communication system 10 achieves its operations with minimal overhead. The proffered architecture is simple, requires few changes to the routing protocol state machine, and avoids modifications to packet formats or route calculation mechanisms. Note that such an approach is also flexible: allowing a given network device to determine, based on existing network conditions, how much information should be exchanged.

Such an approach to network communications may conserve resources and reduce network overhead. Moreover such information management techniques may limit the number of central processing unit (CPU) cycles needed to be performed by a given network component, as the signaling information being exchanged is minimized. In essence, reachability information is exchanged in order to quickly route information, whereas topology information is retrieved at a future time. Thus, because less information is being transmitted in the network, fewer resources are consumed as the data is properly processed. Additionally, the reduction in network traffic may translate into less network bandwidth being occupied by routing protocols engaged in such data exchanges.

Note that the bandwidth optimization achieved by communication system 10 may be particularly important in certain types of networks, e.g. lower speed networks, shared medium networks, etc., but also generally beneficial in all packet communications. Many network scenarios, for example in mobile ad hoc network (MANET) applications, generally include very slow speeds and/or low bandwidth links that are included in the system. Other network considerations duly accounted for by communication system 10 may include battery constraints that are present in many network devices and timing limitations that need to be properly managed.

It is important to note that the steps in FIGS. 2 and 3 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving a routing protocol packet (e.g. a HELLO packet), communication system 10 may be applicable to other exchanges, routing protocols, or routed protocols in which packets (not necessarily the routing protocol packets described) are exchanged in order to provide routing updates or awareness information. For example, communication system 10 could readily be implemented in conjunction with any: 1) non-stop forwarding (NSF) protocol; 2) border gateway protocol (BGP); 3) multi-protocol label switching (MPLS) protocol; 4) intermediate system-to-intermediate system (IS-IS) protocol; 5) optimized link state routing (OLSR); 6) express forwarding (EF) protocol; 7) open shortest path first (OSPF) protocol; and 8) stateful switch over (SSO) protocol.

Moreover, communication system 10 may be applicable to any suitable element or component within the network that seeks to identify an optimal set of routing paths and become aware of its neighboring devices through any communications protocol. Thus, any application where there is a need to communicate state information (potentially in an incremental manner), and where synchronization may be beneficial, may benefit from the teachings of communication system 10. Such a technique offered by communication system 10 could be applied to any link state protocol. For example, any mobility protocol (e.g. optimized link state routing (OLSR): RFC 3626), could benefit from the extensive teachings of communication system 10.

In addition, although communication system 10 has been illustrated with reference to particular elements and operations that facilitate the communication process, these elements and operations may be replaced by any suitable architecture or process that achieves the intended functionality of communication system 10. For example, an external component or module may be positioned in front of each of network elements A-F in order to provide one or more operations as described herein. In addition, network elements A-F may be capable of executing numerous other operations other than those described with reference to FIGS. 1-3. The present invention anticipates considerable flexibility in the placement, positioning, configuration, and operations of network elements A-F.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for communicating packets in a network environment, comprising:
a first network element operable to communicate with a second network element in order to achieve adjacency, wherein the adjacency is achieved by the first network element communicating a first summary update to the second network element and by the second network element communicating a second summary update to the first network element, and wherein the first and second summary updates include, at least, locally generated state information and a single link state, the first and second network elements each including a link state database operable to store the first and secondary summary updates in the first and second network elements respectively, the first network element using out of band resynchronization after the adjacency is achieved in order to achieve full synchronization of the link state databases, the single link state describing reachable destinations in an associated network, whereby each of the reachable destinations includes a destination and a cost metric.

2. The apparatus of claim 1, wherein the first network element is further operable to set a selected time interval to determine when to fully synchronize the link state databases.

3. The apparatus of claim 1, wherein the first network element is further operable to set an additional time interval for a third network element to achieve full synchronization with the first network element, and wherein the first network element achieves full synchronization with the second network element before attempting to fully synchronize with the third network element.

4. The apparatus of claim 1, wherein the network element implements a communications protocol that is selected from the group consisting of:
 a) non-stop forwarding (NSF) protocol;
 b) border gateway protocol (BGP);
 c) multi-protocol label switching (MPLS) protocol;
 d) intermediate system-to-intermediate system (IS-IS) protocol;
 e) optimized link state routing (OLSR);
 f) express forwarding (EF) protocol;
 g) open shortest path first (OSPF) protocol; and
 h) stateful switch over (SSO) protocol.

5. A method for communicating packets in a network environment, comprising:
 communicating, by a first network element, a first summary update to a second network element; and
 receiving a second summary update from the second network element, wherein the exchange of the first and second summary updates achieves adjacency between the first and second network elements, and wherein the first and second summary updates include, at least, locally generated state information and a single link state, the first and second network elements each including a link state database operable to store the first and secondary summary updates in the first and second network elements respectively, the first network element using out of band resynchronization after the adjacency is achieved in order to achieve full synchronization of the link state databases, the single link state describing reachable destinations in an associated network, whereby each of the reachable destinations includes a destination and a cost metric.

6. The method of claim 5, further comprising:
 setting a selected time interval to determine when to fully synchronize the link state databases.

7. The method of claim 5, further comprising:
 setting an additional time interval for a third network element to achieve full synchronization with the first network element, wherein the first network element achieves full synchronization with the second network element before attempting to fully synchronize with the third network element.

8. A system for communicating packets in a network environment, comprising:
 means for communicating, by a first network element, a first summary update to a second network element; and
 means for receiving a second summary update from the second network element, wherein the exchange of the first and second summary updates achieves adjacency between the first and second network elements, and wherein the first and second summary updates include, at least, locally generated state information and a single link state, the first and second network elements each including a link state database operable to store the first and secondary summary updates in the first and second network elements respectively, the first network element using out of band resynchronization after the adjacency is achieved in order to achieve full synchronization of the link state databases, the single link state describing reachable destinations in an associated network, whereby each of the reachable destinations includes a destination and a cost metric.

9. The system of claim 8, further comprising:
 means for setting a selected time interval to determine when to fully synchronize the link state databases.

10. The system of claim 6, further comprising:
 means for setting an additional time interval for a third network element to achieve full synchronization with the first network element, wherein the first network element achieves full synchronization with the second network element before attempting to fully synchronize with the third network element.

11. Software for communicating packets in a network environment, the software being embodied in a computer readable medium and comprising computer code such that when executed is operable to:
 communicate, by a first network element, a first summary update to a second network element; and
 receive a second summary update from the second network element, wherein the exchange of the first and second summary updates achieves adjacency between the first and second network elements, and wherein the first and second summary updates include, at least, locally generated state information and a single link state, the first and second network elements each including a link state database operable to store the first and secondary summary updates in the first and second network elements respectively, the first network element using out of band resynchronization after the adjacency is achieved in order to achieve full synchronization of the link state databases, the single link state describing reachable destinations in an associated network, whereby each of the reachable destinations includes a destination and a cost metric.

12. The medium of claim 11, wherein the code is further operable to:
 set a selected time interval to determine when to fully synchronize the link state databases.

13. The medium of claim 8, wherein the code is further operable to:
 set an additional time interval for a third network element to achieve full synchronization with the first network element, wherein the first network element achieves full synchronization with the second network element before attempting to fully synchronize with the third network element.

* * * * *

UNITED STATES PATENT AND TRADEMARK OFFICE
CERTIFICATE OF CORRECTION

PATENT NO. : 7,391,730 B1  
APPLICATION NO. : 10/895719  
DATED : June 24, 2008  
INVENTOR(S) : Madhavi W. Chandra et al.

It is certified that error appears in the above-identified patent and that said Letters Patent is hereby corrected as shown below:

Title Pg, Item
(73) Assignee, after "Cisco Technology", insert --, Inc.--.

Signed and Sealed this

Eleventh Day of November, 2008

JON W. DUDAS  
*Director of the United States Patent and Trademark Office*